(12) United States Patent
Deeley

(10) Patent No.: US 8,382,435 B2
(45) Date of Patent: Feb. 26, 2013

(54) OPPOSED TILTING BLADE, VERTICAL AXIS WIND TURBINE POWER GENERATOR

(76) Inventor: Peter G. R. Deeley, San Bernardino, CA (US)

( * ) Notice: Subject to any disclaimer, the term of this patent is extended or adjusted under 35 U.S.C. 154(b) by 550 days.

(21) Appl. No.: 12/687,682

(22) Filed: Jan. 14, 2010

(65) Prior Publication Data

US 2010/0209250 A1 Aug. 19, 2010

Related U.S. Application Data

(60) Provisional application No. 61/207,789, filed on Feb. 18, 2009.

(51) Int. Cl.
*F03D 7/06* (2006.01)

(52) U.S. Cl. ............ 416/139; 415/4.2; 415/2.4; 416/17; 416/41

(58) Field of Classification Search .................. 415/4.2, 415/4.4; 416/17, 41, 117, DIG. 4, 139
See application file for complete search history.

(56) References Cited

U.S. PATENT DOCUMENTS

| | | |
|---|---|---|
| 175,032 A | 3/1876 | Cleaver |
| 185,924 A | 1/1877 | Howland et al. |
| 504,301 A | 8/1893 | Davis et al. |
| 584,986 A | 6/1897 | Chapman |
| 631,982 A | 8/1899 | Bruce |
| 1,352,952 A | 9/1920 | Gracey |
| 1,581,537 A | 4/1926 | Heeigh |
| 1,915,689 A | 6/1933 | Moore |
| 2,170,911 A | 8/1939 | Raulerson |
| 3,810,712 A | 5/1974 | Hillman |
| 4,818,180 A | 4/1989 | Liu |
| 5,083,902 A | 1/1992 | Rhodes |
| 6,441,507 B1 * | 8/2002 | Deering et al. ................. 290/44 |
| 7,118,341 B2 * | 10/2006 | Hartman .......................... 416/17 |
| 7,284,949 B2 * | 10/2007 | Haworth ......................... 415/4.2 |
| 7,931,440 B2 * | 4/2011 | Bobowick ................. 416/132 B |
| 8,206,106 B2 * | 6/2012 | Syrovy ............................. 416/83 |
| 2005/0082838 A1 * | 4/2005 | Collins ............................ 290/55 |
| 2008/0075594 A1 * | 3/2008 | Bailey et al. ................... 416/104 |
| 2010/0140949 A1 * | 6/2010 | Pitre et al. ....................... 290/55 |

FOREIGN PATENT DOCUMENTS

WO    WO2009/003285    *  1/2009

OTHER PUBLICATIONS

Olivier, Wind Turbine with Vertical Axis with Blades Fitted with Return Means, Jan. 8, 2009, Machine translation of WO2009/003285.*

* cited by examiner

*Primary Examiner* — Edward Look
*Assistant Examiner* — Liam McDowell
(74) *Attorney, Agent, or Firm* — Kirk A Buhler; Buhler & Associates

(57) ABSTRACT

Improvements in A wind generator, that may also be called and relates to, windmill, turbine or aero generator, on a vertical axis. The vertical axis gives the windmill the ability to be turned by air, or liquid if inverted, from any direction parallel to the earth's surface. Multiple blades rotate through a horizontal axis into the wind to lessen air resistance on one side while turning vertically on the other side to gain energy from the wind. The system is counter-weighted as needed, to reduce energy loss, by different methods including but not limited to gears, levers, pneumatics, cables, hydraulics or added counter-weight. The electrical generating machinery is below the blades or at the bottom of the vertical drive shaft.

12 Claims, 6 Drawing Sheets

OPPOSED TILTING BLADE, VERTICAL AXIS WIND TURBINE POWER GENERATOR

CROSS REFERENCE TO RELATED APPLICATION

This application claims the benefit of Provisional 61/207,789 filed Feb. 18, 2009 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a windmill. More particularly, the present windmill uses opposed tilting blades mounted on a vertical axis to generate power.

2. Description of Related Art Including Information Disclosed Under 37 CFR 1.97 and 1.98

This windmill harnesses the power of the wind and turns it into electricity via a generator. Many such windmills have been produced but the vertical axis wind turbines generally lack the efficiency of a traditional horizontal axis wind turbine. However, there is a need for vertically axis turbines as they do not need to be aimed into the wind, are more efficient in the use of land-space and should also prove to be safer because the bulk of the weight of the entire apparatus is near the ground. This windmill provides a more efficient method for harnessing wind power and although it uses more moving parts than previously designed vertical axis wind turbines, its efficiency and simplicity of design will make it worthwhile.

Several products and patents have been issued for vertical windmills where the blade tips to increase or decrease wind drag depending upon rotational position of the blade. Exemplary examples of patents covering these products are disclosed herein.

U.S. Pat. No. 1,581,537 issued Apr. 20, 1926 to H. K. Hennigh, U.S. Pat. No. 1,352,952 issued Sep. 14, 1920 to J. G. Gracey and U.S. Pat. No. 584,986 issued on Jun. 22, 1897 to J. A. Chapman all disclose a vertical windmill where a counterweight arm maintains to blade in a vertical orientation when the blade is being pushed by the wind and allows the blade to tip open when the blade is returning. While these patents disclose a vertical windmill with tipping blades the blades form a single unit and are not opposing.

U.S. Pat. No. 1,915,689 issued Aug. 27, 1933 to I. T. Moore discloses a windmill with opposing blades mounted to a circular track. The circular track provides support to the ends of the blades and further blocks wind flow into the blades. While this patent discloses tipping blades the blades are supported in an outer ring where a mechanical linkage links the blades together.

U.S. Pat. No. 504,301 issued to E. L. Davis & J. N White on Aug. 29, 1893 and U.S. Pat. No. 185,924 issued Jan. 2, 1977 to E. Howland & J. B. Sweetland both disclose windmills where the blades on opposite ends of the windmill are set 90 degrees opposed. In operation, linking the opposing blades will result in the both blades operating in a partially opened and closed condition where efficiency of the blades is significantly reduced.

What is needed is a vertical shaft windmill where each vane of the windmill is independent and can articulate to provide optimal efficiency. The proposed application provides this solution.

BRIEF SUMMARY OF THE INVENTION

It is an object of the opposed tilting blade turbine for the vertical axis, wind driven turbine uses blades that rotate on the horizontal axis. The vertical axis eliminates the need for the array of blades to be turned to face an oncoming wind. This significantly reduces the mechanical complexity when the direction of the wind is not constant.

It is an object of the opposed tilting blade turbine for the vertical axis, wind driven turbine for each pair of blades to be attached to a shaft, where they rotate on bearings on the housing/drive shaft and are aligned in such a way that as one of the blades collects the power of the wind the other feathers downwind thereby reducing air resistance. This provides and optimal attack angle for the blades to reduce mechanical inefficiencies.

It is still another object of the opposed tilting blade turbine for the vertical axis, wind driven turbine for each blade to assist the other in gaining the correct position and uses the same wind power to do this. Each of the systems shown also has a balanced weight system to reduce loss of power.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 1 a perspective of the opposed rotating blade, vertical axis wind turbine power generator.

DETAILED DESCRIPTION OF THE INVENTION

Drawings

Figure 1:
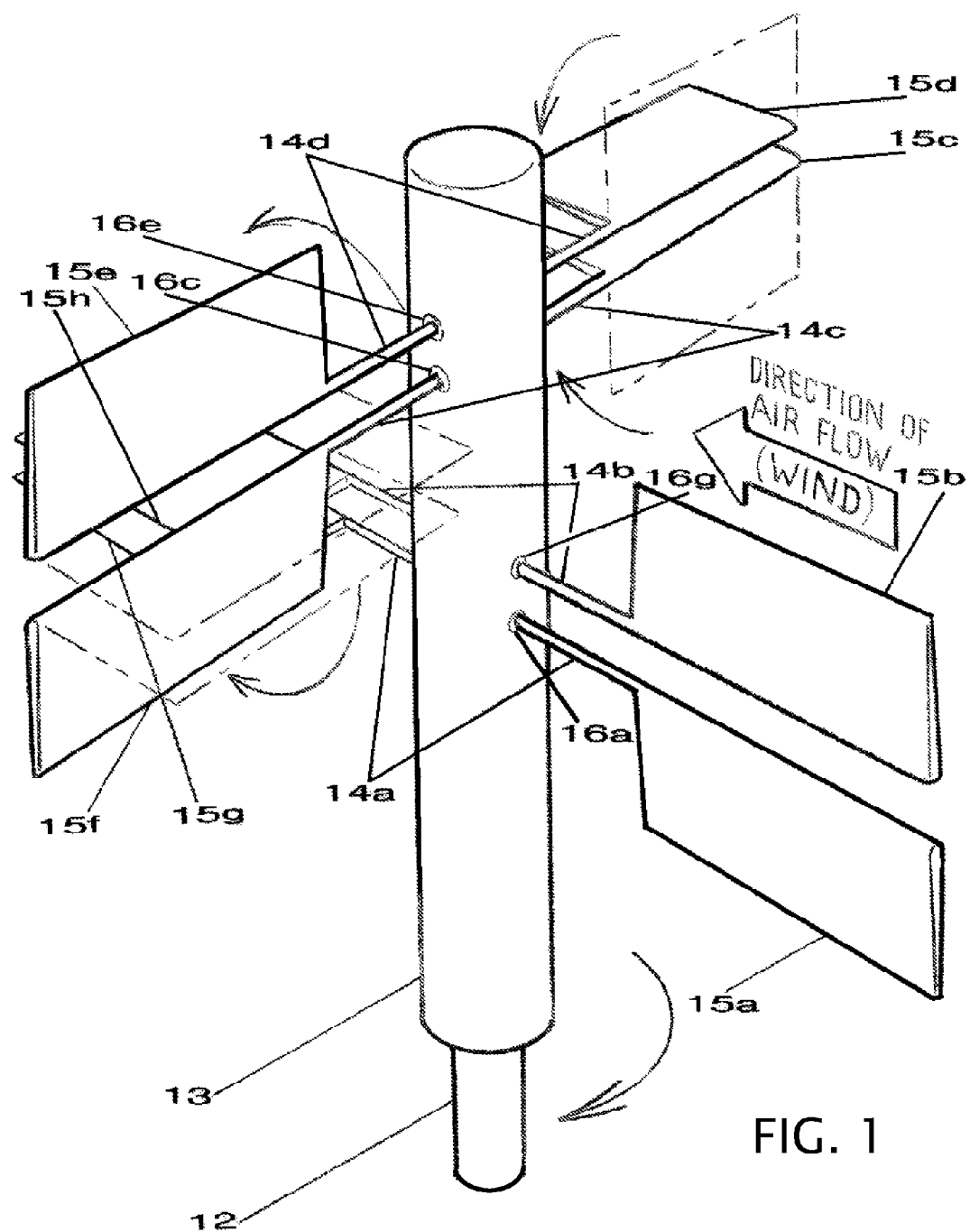

Reference Numerals $7c$, & $7d$ levers
$8b$ Rotational stabilizer
$9a$, $9b$, $9c$, & $9d$, counterweights
$10a$, & $10b$ override stops
$11a$, stop levers 12 drive shaft
13 housing
14a, 14b, 14c, & 14d, blade shafts
15a, 15b, 15c, 15d, 15e, 15f, & 15g blades
16a, 16c, 16e, & 16g bearings
17a, 17b "S" belts
18a, 18b bearing housings FIG. 1 shows a perspective of the opposed rotating blade, vertical axis wind turbine power generator, in accordance with the windmill and its blades assemblies including the blade shafts 14a, 14b, 14c, 14d, and the blades 15a, 15b, 15c, 15d, 15e, 15f, 15g, mounted to the housing 13. Each of the blades 15a, 15b, 15c, 15d, 15e, 15f, and 15g is wind foil shaped to minimize wind drag when the blades move against the wind. The housing 13 is secured to a vertical drive shaft 12 that is attached at the lower section to a generator through gears or transmission. The gears, transmission and generator are not shown. Each of the shafts 14a, 14b, are oriented one above the other but can also be mounted side-by-side, and a transmission causes the shafts to counter rotate the blades 15a, 15b, and blades 15g, 15h, ninety degrees (90°). Shafts 14c, 14d are shown mounted one above the other but can also be mounted side-by-side, and counter rotate ninety degrees (90°) by means of a transmission. The pair of shafts 14a, 14b is horizontally mounted above and below each other and are oriented ninety degrees (90°) to the other previously mentioned shafts 14c, 14d. Each pair of shafts 14a, 14b and pair 14c, 14d operates independently of each other. Each shaft has two blades where each blade is mounted on each end of each shaft.

Figure 2:
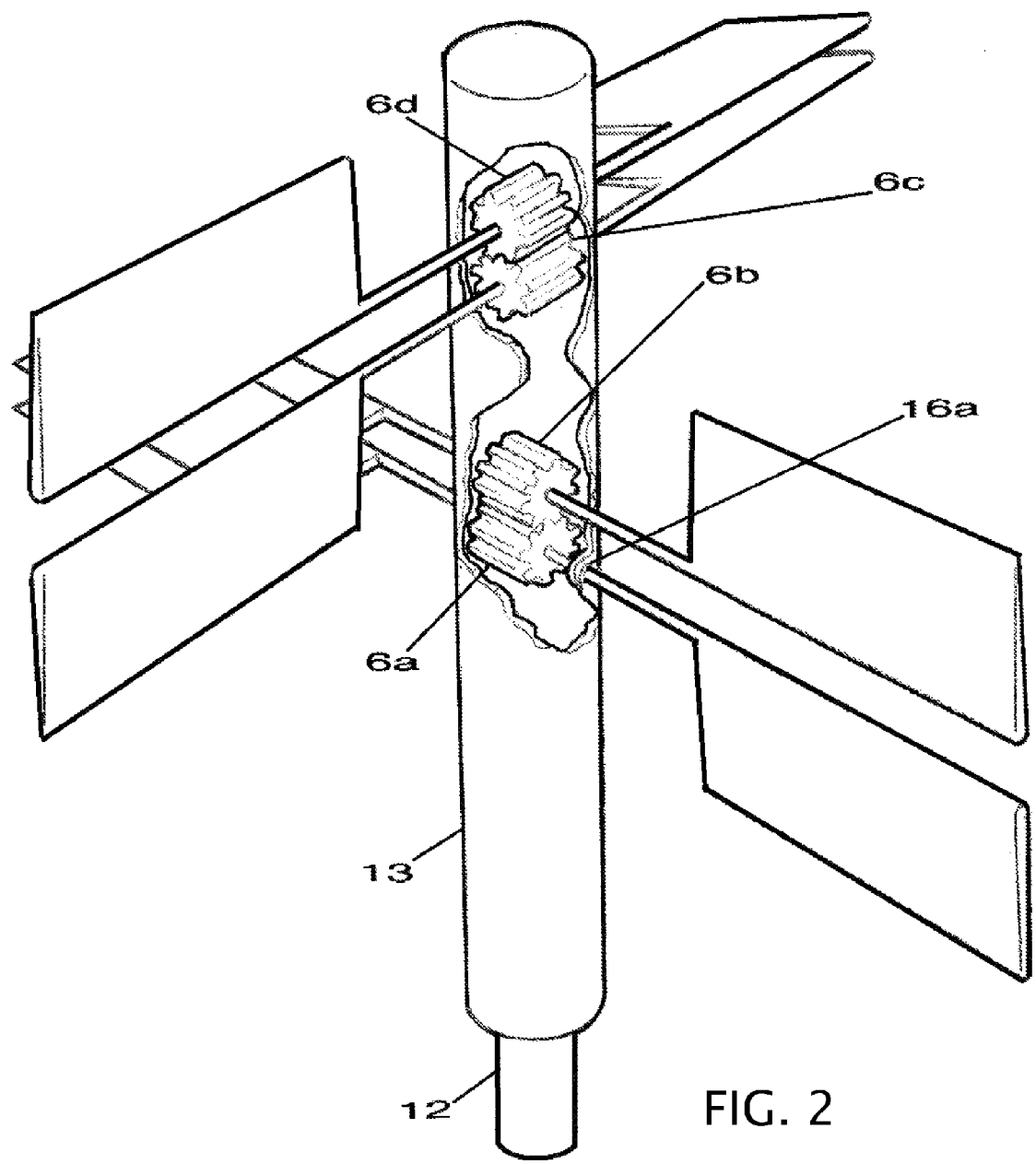
FIG. 2 is a cut-away view of the same blades assemblies displaying one method of driving the shafts pairs.

FIG. 2 shows a cut-away view of the same blades assemblies displaying one method of driving the shafts pairs 14a, 14b, and shaft pairs 14c, 14d, by a set of two interlocking gears 6a, 6b and 6c, 6d fixed to the housing and drive shaft assembly by bearings 16a, 16b, 16e, 16c, (16d, 16f, 16g 16h, are not visible) so they turn ninety degrees (90°) on the horizontal axis. Each blade shaft has two blades configured ninety degrees (90°) to each other on each side of the housing and drive shaft assembly.

Figure 3:
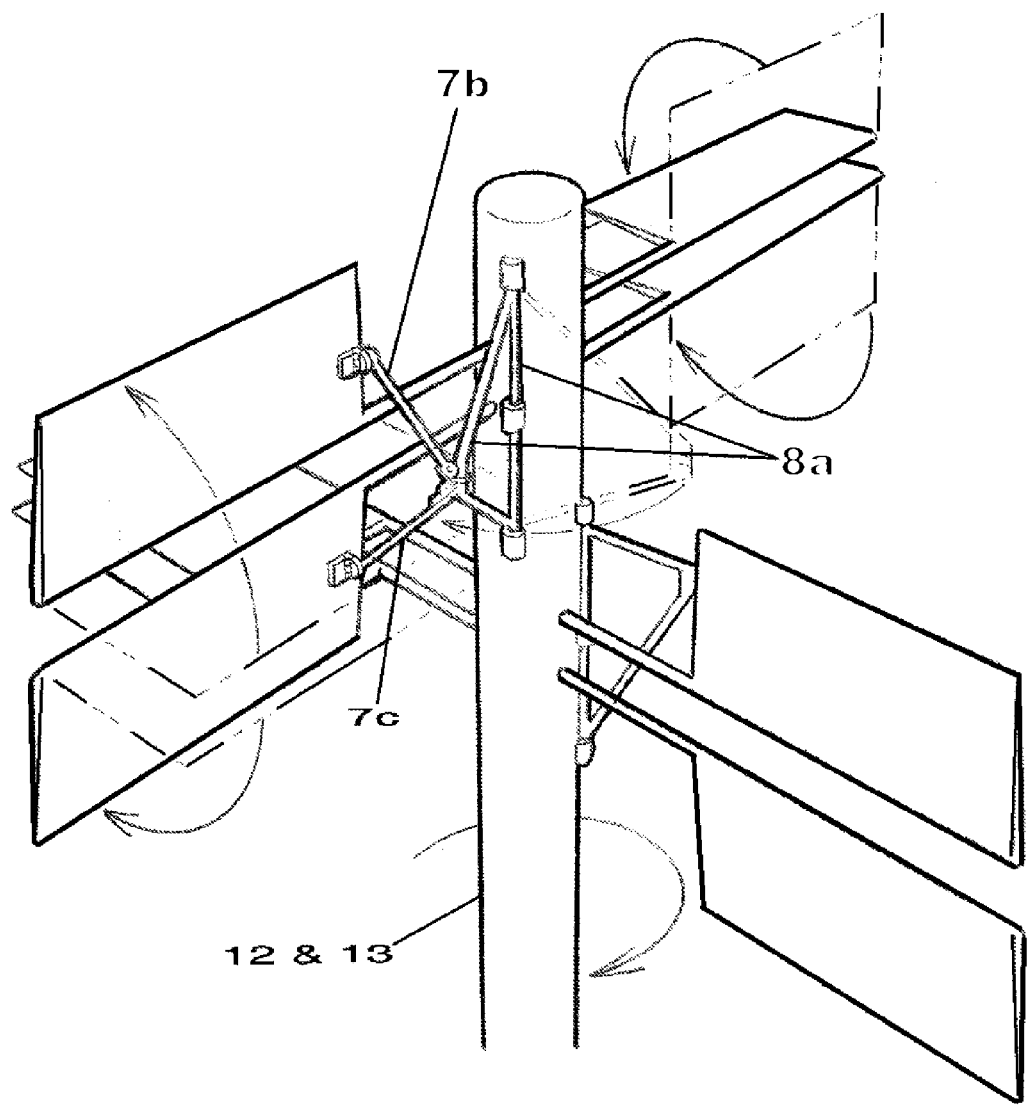
FIG. 3 show an alternative way to achieve counter rotation in the pair of blade shafts.

FIG. 3 show a second preferred embodiment that shows a way to achieve counter rotation in the pair of blade shafts 14a, 14b and blade shafts 14c, 14d the counter rotation is by means of levers. Lever 7b has a two-hinge assembly or a universal joint at both the blade end and the rotation stabilizer end 8a. The rotational stabilizer 8a maintains horizontal movement for one end of the levers 7b and 7c. This arrangement is repeated on each set of blades to maintain equal weight and mechanical stability.

Figure 4:
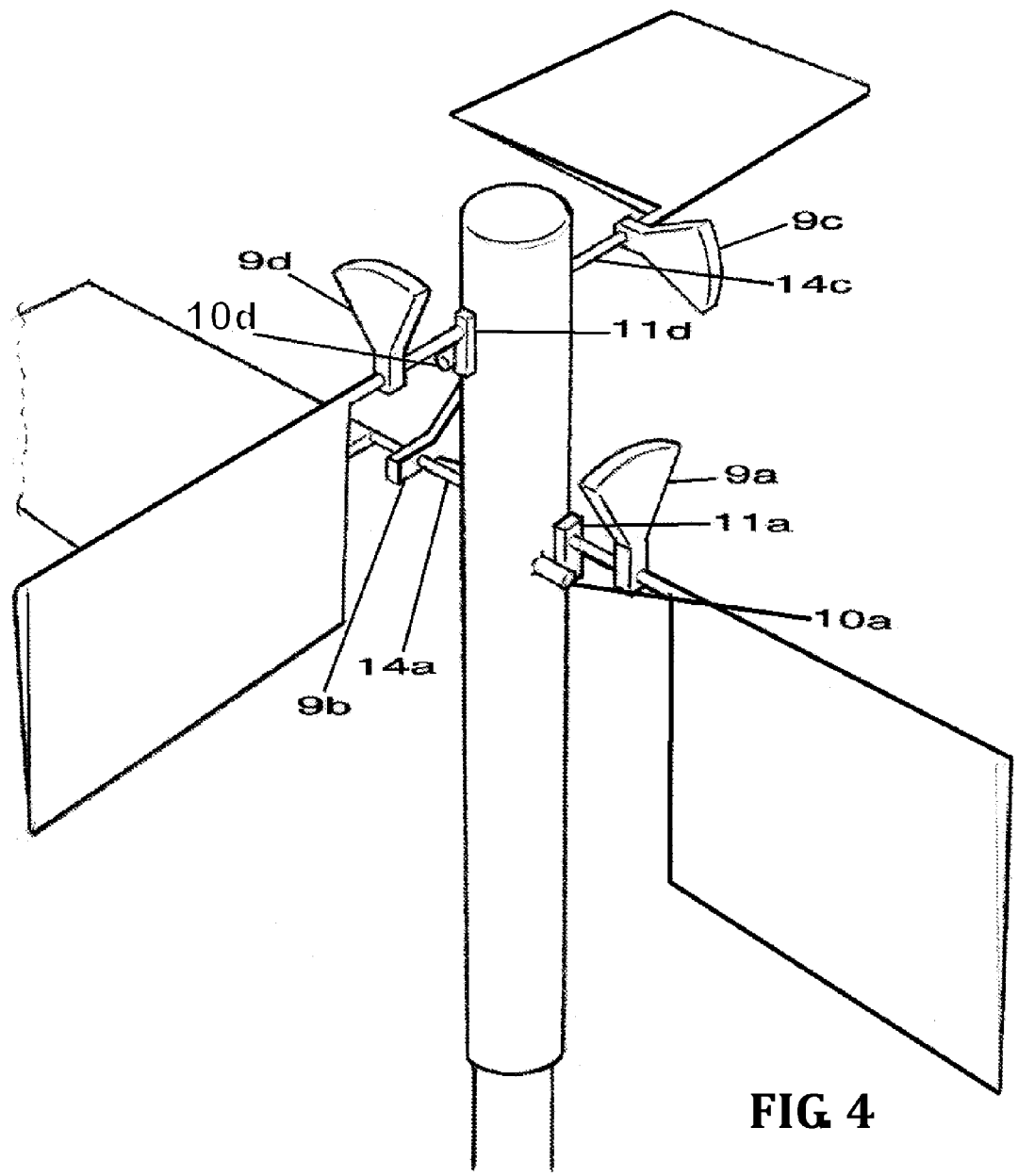
FIG. 4 shows a method for achieving the intention of the windmill using half the number of blades.

FIG. 4 shows a third preferred embodiment that achieves the intention of the windmill using half the number of blades. Counter weights 9a, 9d, 9b, 9c are added to the opposite side of the blades to eliminate any undesirable weight factor. Motion stops 10a 10d, (10b and 10c are not visible) secured to the housing/drive-shaft to prevent over-travel of the blade beyond ninety degrees (90°). The stop levers 11a, 11d (11b and 11c are not visible) but are fixed to the blade shafts 14a, 14c in two places.

Figure 5:
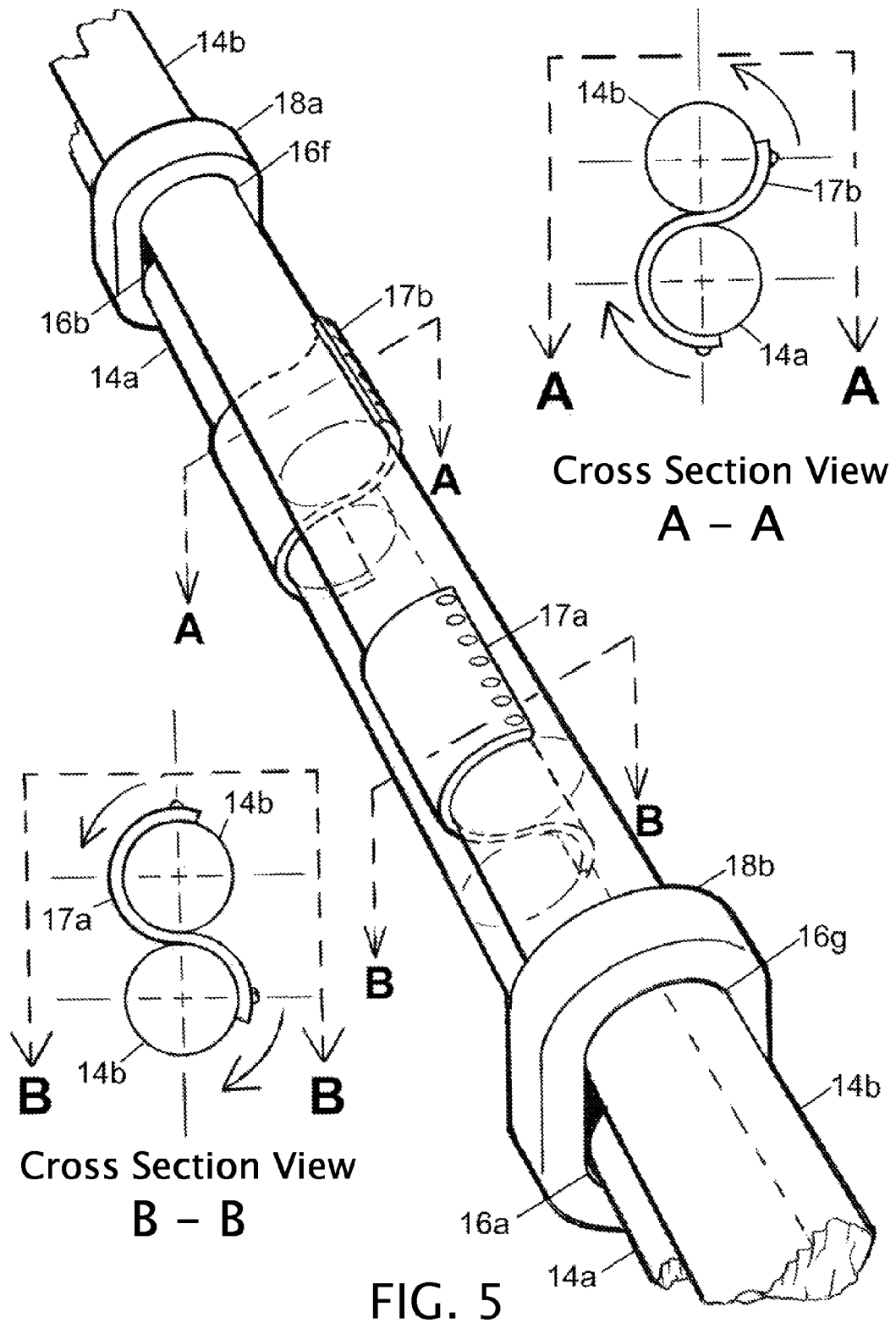
FIG. 5 shows an alternative way to counter-balance and rotate the blades ninety degrees (90°) to affect their operation

FIG. 5 shows an alternative way to counter-balance and rotate the blades ninety degrees (90°) to affect their operation. Only the center portion of the blade shafts 14a, 14b are shown with the housing removed. Two bearing housings, 18a and 18b, house two bearings each 16b and 16f, in bearing housing 18a, bearings, 16a and 16g, in housing 18b they allow the two shafts (14a and 14b) to remain aligned and in position and turn through ninety degrees (90°). "S" belt 17b is attached at the end edge to blade shaft 14b at the ninety degree (90°) position; passes between shafts 14a, 14b and is fixed at the end edge to blade shaft 14a at the one hundred and eighty degree (180°) point. "S" belt 17a is attached at the end edge to blade shaft 14b at the zero (360°) position, passes between shafts 14a, 14b and is fixed at the end edge to blade shaft 14a at the ninety degree (90°) point. The tension in "S" belts 17a and 17b provide traction to drive the blade shafts 14a, 14b in opposite directions. Two belts are shown to simplify depiction, but three of more would be preferred to balance the system and allow the system to be inverted. This configuration could also be applied using link chains (bicycle type) or link belts.

Figure 6:
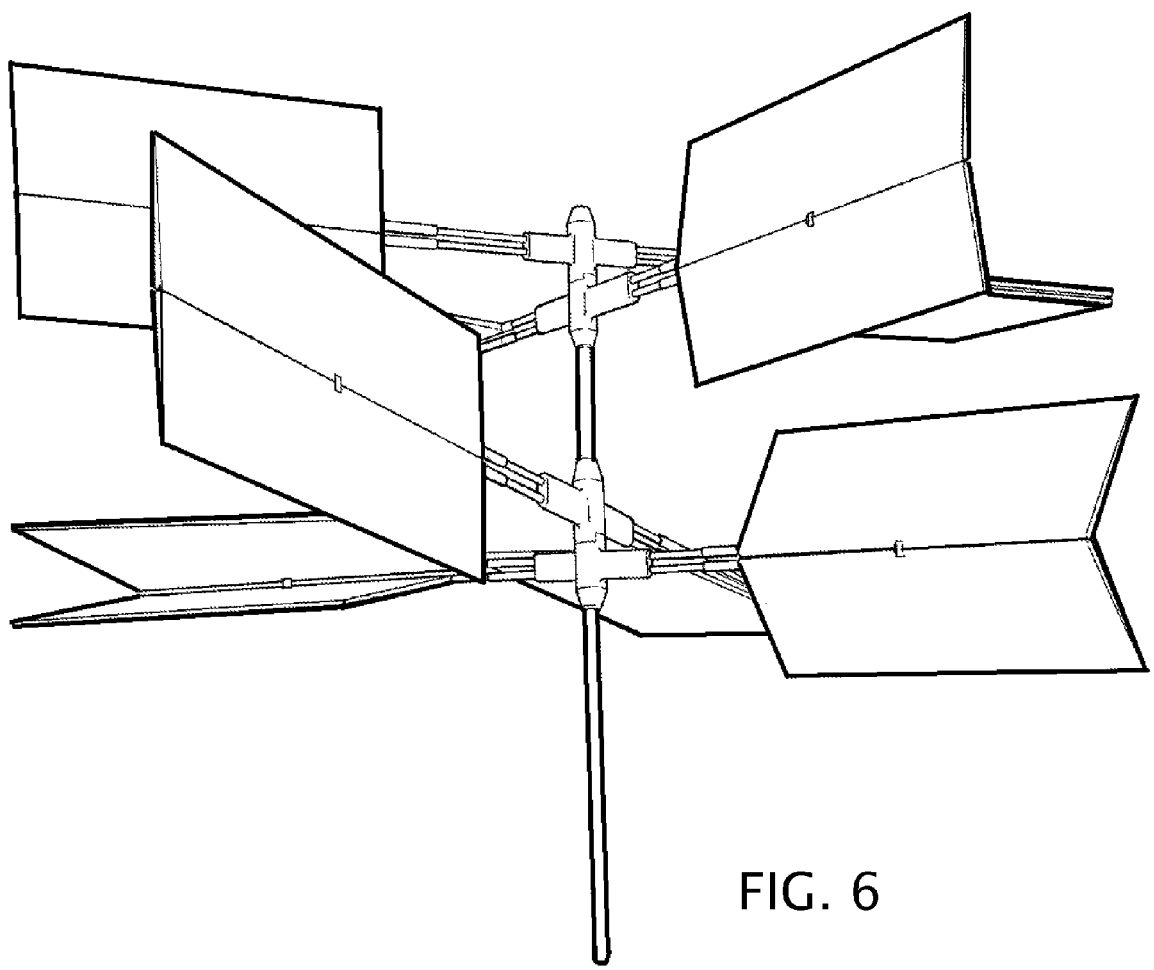
FIG. 6 shows a multiple blade configuration using eight (8) pairs of blades

FIG. 6 shows a multiple blade configuration using eight (8) pairs of blades.

Operation

In operation a greater amount of energy can be obtained from the movement of air or liquid than previously designed wind mills, turbines, or other systems that obtaining energy from wind. The quarter circle rotation of the blades allows one blade set to gather wind energy in its vertical plane while on another end of the shaft the blade is horizontally aligned into the wind on its recovery to its wind opposing position, giving a small cross-section and thus less air resistance. The system is counterbalanced or counter-weighted to reduce loss of energy using a transmission like gears, levers, belts, chain, hydraulics, pneumatics, cable systems or weights. Six effects increase the energy effectiveness of this wind generator:

(1) the vertical access component of this windmill allows operation from wind coming from any direction in the horizontal plane parallel to the ground
(2) less air resistance on the recovering blades
(3) self actuating system, less energy loss
(4) more than two sets of blades may be used and stacked giving a greater amount of torque energy to the generator as required
(5) allows for any sudden variations in wind direction.
(6) a generator located at the bottom of the shaft gives less wind.

Thus, specific embodiments of a vertical-axis wind generator have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A vertical-axis wind generator, comprising:
at least two pairs of horizontally rotating wind gathering blades having opposed ends said wind gathering blades on each end are oriented at a 90 degree rotation from each other;
each pair of horizontal rotating wind gathering blades further has a complementary adjacent wind gathering blade wherein said set of complimentary wind gathering blades fold essentially flat together and 180 degrees opposed wherein;
said folding is with a transmission that pivots vertically from a vertical driveshaft and links said complimentary blades together such that they operate in unison wherein;
said transmission is with lever arms having a two-hinge assembly;
said wind gathering blades are counter balanced;
said wind gathering blades are counter-weighted; whereby
(a) a wind drives said wind gathering blades around a drive shaft;
(b) as each of said wind gathering blade comes into said wind, a respective one of said wind gathering blades is driven flat by said wind; whereby (c) tipping a corresponding one of said wind gathering blades opposing said respective one of said wind gathering blades on a wind gathering side to a vertical orientation to harness energy from said wind, and (d) said vertical-axis wind generator is weight balanced to reduce energy loss.

2. The vertical-axis wind generator according to claim 1 wherein each of said wind gathering blades is wind foil shaped.

3. The vertical-axis wind generator according to claim 1 that further includes a power generator that is driven from said vertical axis.

4. The vertical-axis wind generator according to claim 3 wherein said power generator is located below said blades or in a base of said vertical-axis wind generator.

5. The vertical-axis wind generator according to claim 1 wherein there are four pairs of horizontally rotating wind gathering blades.

6. The vertical-axis wind generator according to claim 1 wherein each of said pairs of horizontally rotating wind gathering blades operate independently.

7. A vertical-axis wind generator, comprising:

at least two pairs of horizontally rotating wind gathering blades having opposed ends said wind gathering blades on each end are oriented at a 90 degree rotation from each other;

each pair of horizontal rotating wind gathering blades further has a complementary adjacent wind gathering blade wherein said set of complimentary wind gathering blades fold essentially flat together and 180 degrees opposed wherein;

said folding is with chain, belts or cables that wraps from one wind gathering blade to a complimentary wind gathering bade thereby requiring each blade to operate in opposing directions of rotation;

said wind gathering blades are counter balanced;

said wind gathering blades are counter-weighted; whereby (a) a wind drives said wind gathering blades around a drive shaft;

(b) as each of said wind gathering blade comes into said wind, a respective one of said wind gathering blades is driven flat by said wind; whereby (c) tipping a corresponding one of said wind gathering blades opposing said respective one of said wind gathering blades on a wind gathering side to a vertical orientation to harness energy from said wind, and (d) said vertical-axis wind generator is weight balanced to reduce energy loss.

8. The vertical-axis wind generator according to claim 7 wherein each of said wind gathering blades is wind foil shaped.

9. The vertical-axis wind generator according to claim 7 that further includes a power generator that is driven from said vertical axis.

10. The vertical-axis wind generator according to claim 9 wherein said power generator is located below said blades or in a base of said vertical-axis wind generator.

11. The vertical-axis wind generator according to claim 7 wherein there are four pairs of horizontally rotating wind gathering blades.

12. The vertical-axis wind generator according to claim 7 wherein each of said pairs of horizontally rotating wind gathering blades operate independently.

\* \* \* \* \*